(12) United States Patent
Stiesdal

(10) Patent No.: US 12,188,192 B2
(45) Date of Patent: Jan. 7, 2025

(54) STRUCTURAL JOINT FOR OFFSHORE CONSTRUCTIONS AND A METHOD FOR THE ASSEMBLY OF SUCH OFFSHORE FRAME CONSTRUCTIONS AND USE OF SUCH STRUCTURAL JOINT

(71) Applicant: Stiesdal Offshore A/S, Vejlevej 270 (DK)

(72) Inventor: Henrik Stiesdal, Odense C (DK)

(73) Assignee: Stiesdal Offshore A/S, Give (DK)

(*) Notice: Subject to any disclaimer, the term of this patent is extended or adjusted under 35 U.S.C. 154(b) by 311 days.

(21) Appl. No.: 17/431,419

(22) PCT Filed: Feb. 18, 2020

(86) PCT No.: PCT/DK2020/050041
§ 371 (c)(1),
(2) Date: Aug. 16, 2021

(87) PCT Pub. No.: WO2020/169158
PCT Pub. Date: Aug. 27, 2020

(65) Prior Publication Data
US 2022/0120050 A1    Apr. 21, 2022

(30) Foreign Application Priority Data
Feb. 18, 2019   (DK) .............................. PA201970105

(51) Int. Cl.
*E02B 17/00*   (2006.01)
*F03D 13/25*   (2016.01)

(52) U.S. Cl.
CPC .......... *E02B 17/0004* (2013.01); *F03D 13/25* (2016.05); *F05B 2260/303* (2013.01)

(58) Field of Classification Search
CPC ................. E02B 17/0004; F03D 13/25; Y10T 403/32221; F16C 23/045; F05B 2260/303
See application file for complete search history.

(56) References Cited

U.S. PATENT DOCUMENTS 2,753,225 A * 7/1956 Gilmer, III .......... F16C 11/0614
                                                        384/207
2,819,105 A   1/1958 Behnke
(Continued)

FOREIGN PATENT DOCUMENTS

CN         2786365 Y    6/2006
CN       206000859 U    3/2017
(Continued)

OTHER PUBLICATIONS

Sturgeon, A.J.; The Corrosion Behavior of HVOF Sprayed Stainless Steel and Nickel Alloy Coatings in Artificial Seawater; Paper No. 03245 presented at CORROSION 2003, NACE Conference, Mar. 16-21, 2003, San Diego, Ca, USA (Year: 2017).*
(Continued)

*Primary Examiner* — Theodore V Adamos
(74) *Attorney, Agent, or Firm* — Dykema Gossett PLLC

(57) ABSTRACT

Various embodiments of the present disclosure are directed to offshore frame construction. In one example embodiment, an offshore frame construction is disclosed including structural members and a structural joint connecting the structural members. The structural joint includes a fork part, an ear part, and a pin, where the fork part and the ear part includes a bore, and the pin is inserted into the bore. The pin has a non-corroding surface that is a cladding or bushing welded or shrunk or glued or otherwise affixed to the pin which consists of a different material, or the non-corroding surface is continuous with the pin and the pin consists of the non-corroding material. In some specific embodiments, the bore includes a sliding surface, which is fitted with a liner acting as a bearing, and the bearing is an elastomeric bearing.

13 Claims, 5 Drawing Sheets

(56) References Cited

U.S. PATENT DOCUMENTS

| | | | |
|---|---|---|---|
| 3,134,234 A | 5/1964 | Parker et al. | |
| 4,349,952 A | 9/1982 | Decker et al. | |
| 4,467,911 A | 8/1984 | Forshee | |
| 4,638,544 A * | 1/1987 | McNeil | F16C 11/02 16/DIG. 42 |
| 4,842,446 A | 6/1989 | Carruba | |
| 4,893,965 A | 1/1990 | Jordan | |
| 4,932,807 A * | 6/1990 | Rhodes | F16C 11/045 403/147 |
| 6,837,010 B2 * | 1/2005 | Powell | E04H 9/0237 403/174 |
| 2004/0107654 A1 | 6/2004 | Powell et al. | |
| 2004/0128940 A1 | 7/2004 | LaForge | |
| 2006/0277843 A1 | 12/2006 | Livingston et al. | |
| 2007/0189649 A1 | 8/2007 | Montazeri et al. | |
| 2010/0005752 A1 | 1/2010 | Hawkins et al. | |
| 2010/0226785 A1 * | 9/2010 | Livingston | E02B 17/0004 52/745.17 |
| 2010/0313495 A1 | 12/2010 | Grant | |
| 2012/0263544 A1 * | 10/2012 | Oestergaard | E04H 12/10 29/525.08 |
| 2012/0263545 A1 | 10/2012 | Oestergaard et al. | |
| 2013/0177445 A1 * | 7/2013 | Stiesdal | F03D 13/25 416/244 R |
| 2013/0227897 A1 | 9/2013 | Palmer et al. | |
| 2014/0086691 A1 * | 3/2014 | Reales | F03D 13/22 405/224 |
| 2014/0125035 A1 | 5/2014 | Sparkes et al. | |
| 2016/0238062 A1 | 8/2016 | Bennett | |
| 2017/0009480 A1 * | 1/2017 | Bucknell | E04H 12/10 |

FOREIGN PATENT DOCUMENTS

| | | | |
|---|---|---|---|
| CN | 109178211 A | | 1/2019 |
| EP | 0705990 A2 * | | 4/1996 |
| EP | 2511423 A1 | | 10/2012 |
| GB | 557160 A | | 11/1943 |
| GB | 1387726 A | | 3/1975 |
| JP | S5131332 A | | 3/1976 |
| JP | H05169283 A | | 7/1993 |
| JP | H08270667 A | | 10/1996 |
| JP | 2001152475 A | | 6/2001 |
| JP | 2008540918 A | | 11/2008 |
| JP | 2013503306 A | | 1/2013 |
| JP | 2013076440 A | | 4/2013 |
| JP | 2013534583 A | | 9/2013 |
| WO | WO-2006081664 A1 * | | 8/2006 ........... B64C 1/1407 |

OTHER PUBLICATIONS

Reference U continued from above—obtained from https://www.twi-global.com/technical-knowledge/published-papers/the-corrosion-behaviour-of-hvof-sprayed-stainless-steel-and-nickel-alloy-coatings-in-artificial-seawater (Year: 2017).*

China National Intellectual Property Administration; Examination Report issued in counterpart application CN 202080016533.2; Date of Report Oct. 26, 2023.

* cited by examiner

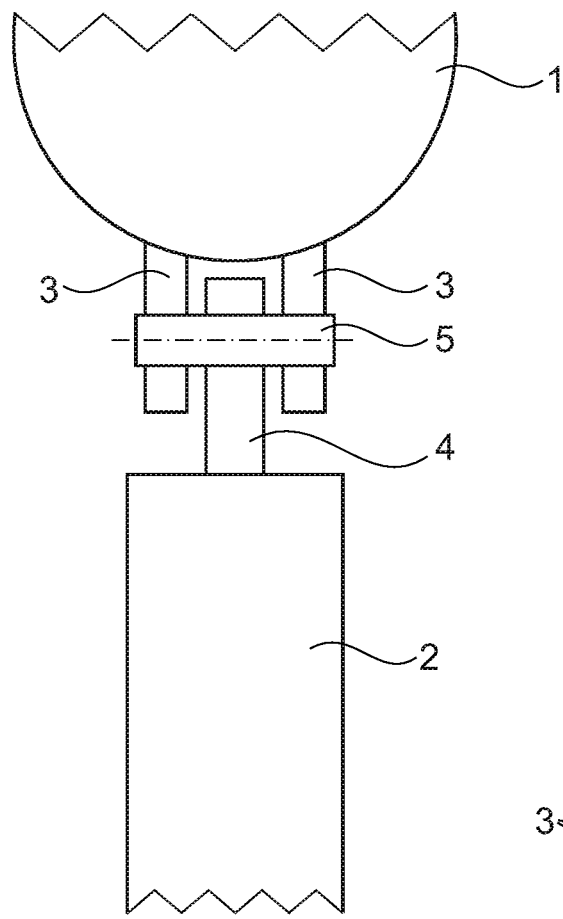
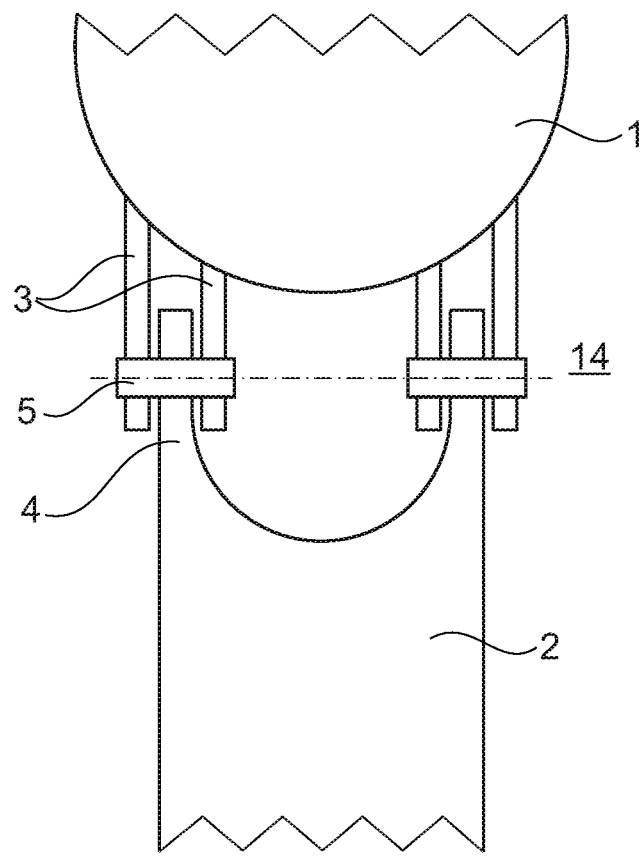

STRUCTURAL JOINT FOR OFFSHORE CONSTRUCTIONS AND A METHOD FOR THE ASSEMBLY OF SUCH OFFSHORE FRAME CONSTRUCTIONS AND USE OF SUCH STRUCTURAL JOINT

CROSS-REFERENCE TO RELATED APPLICATIONS

This application is a national stage filing based upon International PCT application no. PCT/DK2020/050041, filed 18 Feb. 2020, which claims the benefit of priority to Denmark application no. PA 2019 70105, filed 18 Feb. 2019.

FIELD OF THE INVENTION

The present invention relates to a structural joint for offshore constructions, particularly constructions for offshore wind turbines.

Moreover the invention relates to a method for the assembly of such offshore frame constructions.

Furthermore the invention relates to use of such structural joint.

BACKGROUND OF THE INVENTION

Offshore wind turbines can be installed on different types of foundations. At shallow water depths monopiles are typically preferred, but at larger water depths frame constructions are required to provide sufficient stiffness. Floating offshore wind turbine foundations are also often designed as frame constructions.

Such frame constructions can be made as lattice or "jacket" constructions, as tripods, as tetrahedral floating devices, or as other types of constructions composed of columns or braces assembled in nodes. Frame constructions typically have good mechanical properties due to a high stiffness-to-material-use ratio, and they are typically comparatively cost-effective relative to monopiles.

The joining of columns and braces in nodes represents a challenge for offshore frame constructions. Traditionally, in such offshore frame constructions both columns and braces are hollow steel pipes of cylindrical cross-section, and the joints are carried out as welded joints. Due to the complex geometry of a non-axial pipe joint, such welding can only be carried out by hand, and since the inside of braces is generally not accessible, it is not possible to carry out the welding from both sides. Consequently, the welding will be of moderate quality. The geometrical irregularity of the joint gives rise to significant geometrical stress concentrations, and the combination of welds of moderate quality and geometrical stress concentrations leads to a requirement for significant over-dimensioning of the structural members at the joint, and thereby a heavier construction than would otherwise be needed. Furthermore, even though some parts can be pre-fabricated, most of the welding process takes place in situ, on the complete construction, typically at an expensive location, such as in a dry dock or at the quayside. As a consequence, the assembly of an offshore frame construction by welding is a lengthy and costly process, often taking up valuable space for many weeks or even months.

EP 2 067 914 A1 discloses a jacket construction comprising a number of columns and a number of braces in angled alignment, where the nodes are manufactured as steel castings. In this way the node joint itself is not welded. The columns and braces are joined to the node castings by welding, but the advantage relative to conventional welded pipe joints is that the welds are located away from the geometrical stress concentrations and are carried out as simple circumferential welds. As a result, the frame construction can be manufactured with higher quality welds and reduced requirements for over-dimensioning. The arrangement disclosed in EP 2 067 914 A1 does not, however, reduce the in-situ manufacturing time by any significant amount.

EP 2 535 312 B2 discloses a jacket construction for offshore constructions wherein the connection of the columns and braces is established by bolting. The connecting members used in the joints are preferably cast-iron parts. This arrangement eliminates the need for in situ welding and thereby enables considerable assembly time saving. However, in its reliance on bolts it introduces a joining member that typically will require maintenance. It is also well known that the long-term viability of submerged, dynamically loaded bolt connections may be questionable. Consequently, the solution to the challenges of easy-to-assemble nodes appears to have been acquired at the cost of the introduction of additional maintenance.

One solution could be to arrange the connection between columns and braces as pin joints. A pin joint comprises an ear part attached to one member, and a fork part attached to another member. A pin passing through both the ear part and the fork part serves to join the two parts. The relevant joining parts of a pin joint (ears or forks) could be pre-fabricated and incorporated at suitable locations in columns and braces, and this would allow for fast assembly at the costly location for embarkation, i.e. in the dry dock or at the quayside.

Pin joints are known from a wide range of onshore frame constructions, e.g. the Centre Georges Pompidou in Paris and Billund Airport. Pin joints are also used in more flexible structural arrangements, such as the support construction for the canopy over the Airport Centre in Munich Airport.

Pin joints are used in offshore applications where it is accepted that maintenance will be required, e.g. for fairlead connections of mooring lines. Pin joints are not used for structural joints in offshore frame constructions, however.

OBJECT OF THE INVENTION

It is the object of the invention to provide a structural joint for offshore frame constructions such as jackets, tripods, tetrahedral floating devices or other types of offshore constructions composed of columns or braces assembled in nodes and which structural joint avoids the above drawbacks.

Furthermore, it is the object of the invention to provide a method for the assembly of such offshore frame constructions using such structural joints.

DESCRIPTION OF THE INVENTION

These objects are achieved through the features described below and as further set out in the claims.

In a first aspect the invention relates to a pin joint as the connection between the structural members which may be provided in form of columns and braces.

The structural joint according to the invention is peculiar in the structural joint between the structural members comprises a fork part, an ear part, and a pin, wherein said fork part and said ear part comprises a bore, which bore is arranged for receiving said pin. Hereby the structural members are connected to each other. This structural joint may be denoted as a pin joint.

The structural joint is advantageous for use in an offshore wind turbine foundation for the connection between columns and braces.

In a second aspect the invention relates to a method for the assembly of a pin joint for offshore frame constructions.

The method for the assembly of offshore frame constructions comprising structural members is peculiar in comprising the steps of:
Placing the structural members in the proximity of the position to be assembled;
Inserting an ear part provided on a first of the structural members into a fork part provided on a second of the structural members; and
Completing the assembly by inserting a pin in aligned bores provided in said fork part and said ear part, which bores are arranged for receiving said pin.

In one embodiment the joint is similar to the pin joints used in onshore frame constructions, with an ear part attached to one member, and a fork part attached to another member. A pin passing through aligned bores provided in both the ear part and the fork part serves to join the two parts. The relevant joining parts of a pin joint (ears or forks) can be pre-fabricated and incorporated at suitable locations in columns and braces. This will allow for fast assembly at the costly location for embarkation, i.e. in the dry dock or at the quayside. The ear, fork, and pin can be made of steel.

Hydrodynamic forces on the structural members may give rise to micro movements between the pin and the ear and fork. Such micro movements may give rise to fretting and corrosion, and in a subsea environment cathodic protection may be unable to ensure protection due to shielding in the narrow gaps between the members. Consequently, there is a risk that substantial maintenance will be required, typically at joints located subsea, with high associated costs.

A person skilled in the art will appreciate that corrosion is understood to be corrosion in an offshore environment including a subsea environment. Furthermore, a person skilled in the art will appreciate that that non-corroding is understood to be non-corroding in an offshore environment including a subsea environment.

This potential problem is alleviated in another embodiment of the invention. Here the bores in said fork part and said ear part comprise a sliding surface, which is fitted with a liner acting as a bearing. The pin is made of a material that is immune to corrosion, and the sliding surface in the ear and/or the fork is fitted with a liner acting as a bearing. In this way the risk of fretting and corrosion on the mating surfaces is avoided.

A pin that is immune to corrosion may comprise a steel body partly or completely surrounded by a liner made of a material immune to corrosion, or it may be made completely of a material immune to corrosion. Such material may be a composite, or it may be metallic, e.g. aluminum bronze or Alloy 625. Metallic materials immune to corrosion will have an electrochemical potential that is different from the electrochemical potential of steel, and if the liner acting as a bearing is also metallic this may lead to galvanic corrosion between the pin and the liner and/or between the liner and the ear or fork. Such risk of galvanic corrosion may be mitigated by using a liner made of a non-conducting material, such as fiberglass reinforced plastic, PEEK (polyether ether ketone) or some other type of plastic, lignum vitae, rubber etc.

According to a further embodiment the structural joint is peculiar in that the pin has a non-corroding surface, such surface being made as a cladding or bushing welded or shrunk or glued or otherwise affixed to the pin made of a different material, or such surface being continuous with the pin, the pin in its entirety being made of the non-corroding material.

Due to cyclic hydrodynamic loading the pin joint may experience load reversals. As a result, wear may occur between the bearing and the pin, in particular if the water has a significant content of particles.

This potential problem is alleviated in a further embodiment of the invention. In this embodiment, an interference fit is established between the pin and the bearing.

The interference fit may be established by various means, e.g. by an expansion arrangement where the pin is expanded by the axial movement of an internal, tapered part, or by simply making the pin itself tapered and by pushing the pin axially into the bearing until a desired interference fit has been obtained.

A desired fit could be one where the surface pressure of the interference fit is sufficient to ensure that the unloaded surface of the bearing does not lift off from the pin during extreme loading. At this level of fit the surface of the bearing never leaves the surface of the pin, thereby preventing any ingress of particles into the bearing. An alternative fit could be one where the surface pressure of the interference fit is sufficient to ensure that the unloaded surface of the bearing does not lift off from the pin during normal loading. At this level of fit the surface of the bearing never leaves the surface of the pin during normal conditions, and any ingress of particles into the bearing will be limited to a few extreme load conditions.

The bearing in the pin joint may be subject to edge loading in case of out-of-plane loading of the joint, where the plane is defined as a plane perpendicular to the axis of the pin. Such out-of-plane loading may occur e.g. as a result of misalignment in the bearing, or as a consequence of hydrodynamic loading on the members joined by the pin joint.

Such edge loading may be reduced by appropriate shaping of the bearing raceway, with end relief, or by making the pin slightly barrel-shaped, or by a combination of the two.

In another embodiment of the invention the bearing is a spherical bearing, thereby eliminating the risk of edge loading, except for unavoidable loading arising as a consequence of internal friction in the bearing. The spherical bearing inserted into the ear part is a spherical bearing, comprising an externally spherical inner part and internally spherical outer part.

In yet another embodiment of the invention the bearing is made as an elastomeric bearing, e.g. as a rubber bushing. The bushing may be inserted between the pin and the ear, and/or between the pin and the fork. The bushing may be inserted into or vulcanized with an inner metallic bushing and/or an outer metallic bushing.

The pin joint may be established as a single joint, or it may be established as a double or multiple joint. In a preferred embodiment the pin joint is established as a hinge.

DESCRIPTION OF THE DRAWING

In the following, examples of preferred embodiments are described, visualized in the accompanying drawings, in which:

FIG. 8 shows a principle view of a first configuration of an inventive structural joint according to the invention; and FIG. 9 shows a principle view of a different configuration of an inventive structural joint according to the invention.

DETAILED DESCRIPTION OF THE INVENTION

Figure 1:
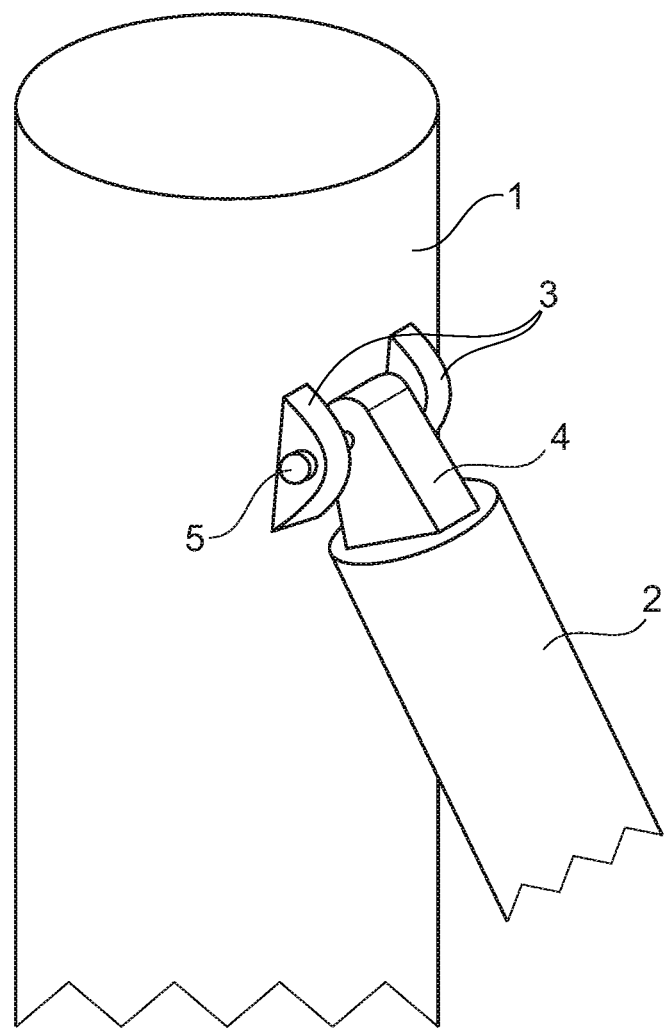
FIG. 1 shows a principle view of an inventive structural joint according to a first exemplary embodiment of the invention.

In the figures, similar or corresponding elements are denoted with the same reference numerals.

FIG. 1 shows a principle view of an inventive structural joint according to a first exemplary embodiment of the invention. A column 1 is joined with a brace 2 with a pin joint. The pin joint comprises two fork parts 3 attached to the column 1, an ear part 4 attached to the brace 2, and a pin 5.

Figure 2:
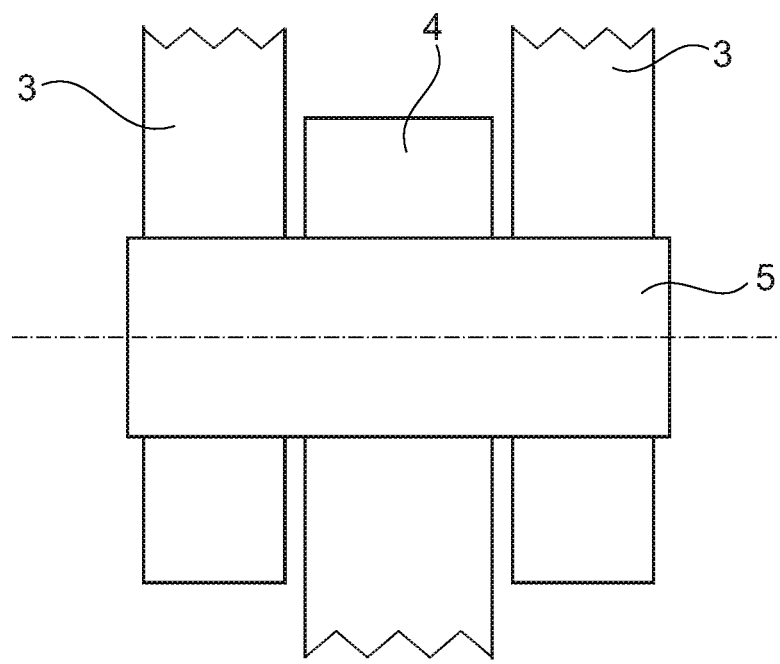
FIG. 2 shows a sectional principle view of an inventive structural joint according to a first exemplary embodiment of the invention.

FIG. 2 shows a sectional principle view of an inventive structural joint according to a first exemplary embodiment of the invention. The fork parts 3 are joined with the ear part 4 by the pin 5. The fork parts 3, the ear part 4 and the pin 5 may be made of steel.

Figure 3:
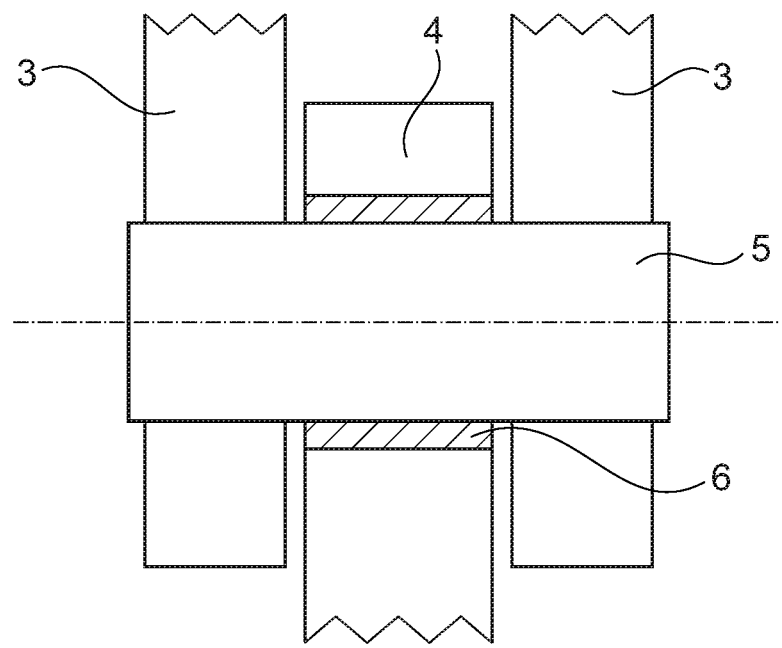
FIG. 3 shows a sectional principle view of an inventive structural joint according to a second exemplary embodiment of the invention.

FIG. 3 shows a sectional principle view of an inventive structural joint according to a second exemplary embodiment of the invention. Here, a bearing 6 is inserted into the ear part 4. The pin may be made of steel or it may be made of a non-corroding material such as e.g. fiberglass reinforced plastic, aluminum bronze or alloy 625. The non-corroding material may be a cladding shrunk or glued or otherwise affixed to a steel pin, or the pin may in its entirety be made of the non-corroding material. The bearing may be metallic, or it may be made with a non-conducting composite material such as fiberglass reinforced plastic or polyether ether ketone (PEEK).

Figure 4:
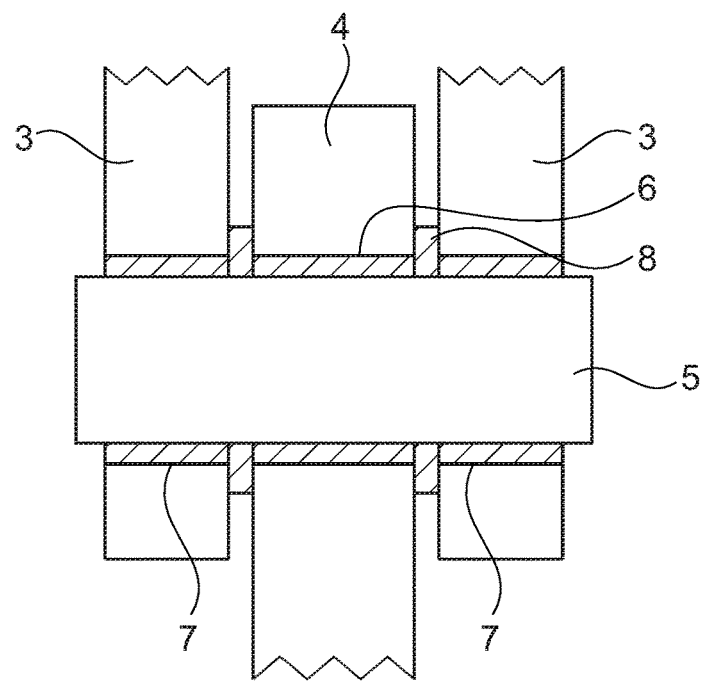
FIG. 4 shows a sectional principle view of an inventive structural joint according to a third exemplary embodiment of the invention.

FIG. 4 shows a sectional principle view of an inventive structural joint according to a third exemplary embodiment of the invention. As in the second exemplary embodiment of the invention, bearing 6 is inserted into the ear part 4. In addition, bearings 7 are inserted into the fork parts 3. Furthermore, axial bearings 8 are inserted between the fork parts 3 and the ear part 4 to ensure that the pin joint is capable of carrying axial loads also.

Figure 5:
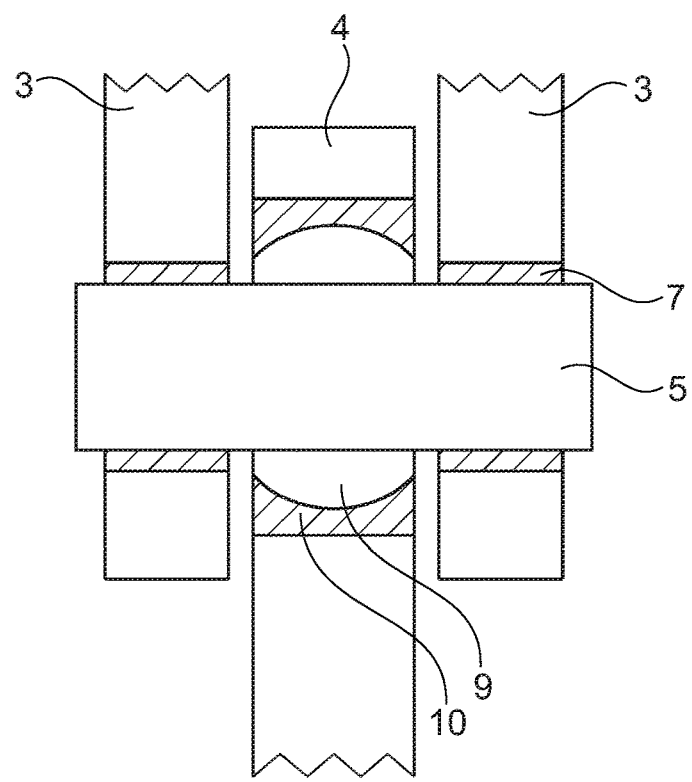
FIG. 5 shows a sectional principle view of an inventive structural joint according to a fourth exemplary embodiment of the invention.

FIG. 5 shows a sectional principle view of an inventive structural joint according to a fourth exemplary embodiment of the invention. Here, the bearing inserted into the ear part 4 is spherical, comprising an externally spherical inner part 9 and an internally spherical outer part 10.

Figure 6:
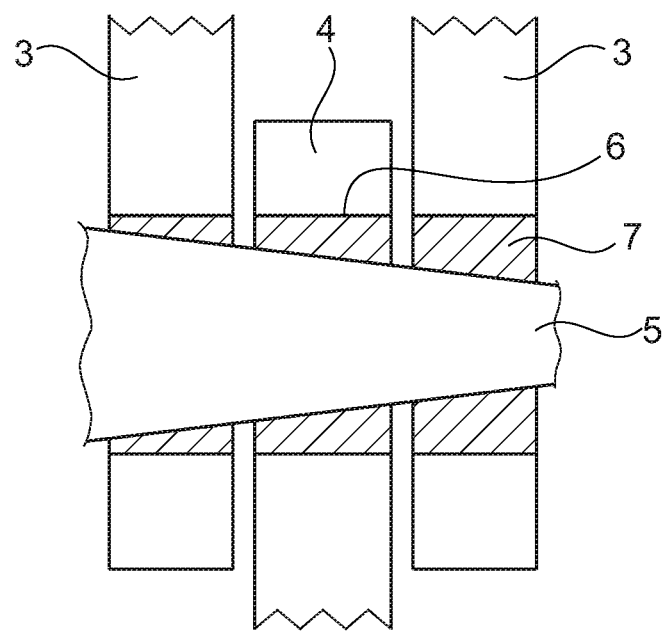
FIG. 6 shows a sectional principle view of an inventive structural joint according to a fifth exemplary embodiment of the invention.

FIG. 6 shows a sectional principle view of an inventive structural joint according to a fifth exemplary embodiment of the invention. Here, both the bearing 6 inserted into the ear part 4 and the bearings 7 inserted into the fork parts 3 are internally tapered, and the pin 5 is equally tapered. When inserted into the assembled position as shown on the figure the pin 5 has a strong press-fit against the bearings 6 and 7, thereby eliminating bearing play and preventing the ingress of wear particles.

Figure 7:
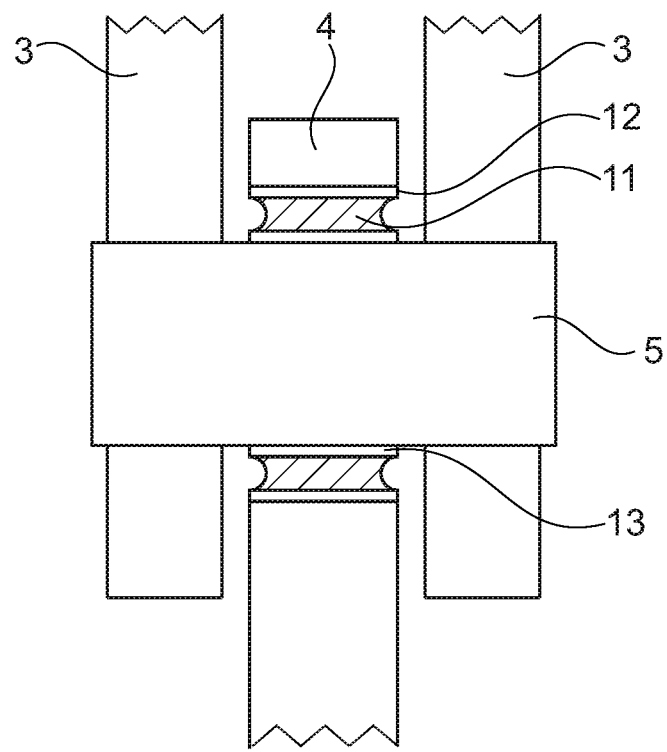
FIG. 7 shows a sectional principle view of an inventive structural joint according to a sixth exemplary embodiment of the invention.

FIG. 7 shows a sectional principle view of an inventive structural joint according to a sixth exemplary embodiment of the invention. Here, an elastomeric bearing is used, comprising a rubber bushing 11 mounted between an outer metallic bushing 12 and an inner metallic bushing 13.

FIG. 8 and FIG. 9 show a principle view of two different configurations of an inventive structural joint according to the invention.

FIG. 8 shows a single pin joint joining the column 1 and the brace 2.

FIG. 9 shows a double-pin joining the column 1 and the brace 2. Here, the pins have a common longitudinal axis 14, making the joint into a hinge.

The foregoing description of preferred and other embodiments is not intended to limit or restrict the scope or applicability of the inventive concepts disclosed. With the benefit of the present disclosure, it will be appreciated that details described with respect to one embodiment disclosed herein can be combined with or used on other embodiments disclosed herein, even though such combination or use may not be explicitly shown or recited herein. In exchange for disclosing the inventive concepts contained herein, the applicants desire all patent rights afforded by the appended claims. Therefore, it is intended that the appended claims include all modifications and alterations to the full extent that they come within the scope of the following claims or the equivalents thereof.

The invention claimed is:

1. An offshore frame construction comprising:
   structural members,
   a structural joint connecting the structural members, wherein the structural joint includes a fork part, an ear part, and a pin, wherein the fork part and the ear part includes a bore, and wherein the pin is inserted into the bore, wherein:
   the pin has a non-corroding surface, and wherein the non-corroding surface is:
      a cladding or bushing welded or shrunk or glued or otherwise affixed to the pin which consists of a different material; or
      continuous with the pin, and the pin consists of the non-corroding material; and
   the bore in the fork part and the ear part includes a sliding surface, which is fitted with a liner acting as a bearing, wherein:
      one or more axial bearings are inserted between the ear part and the fork part,
      the bearing and the one or more axial bearings are made with a non-conducting material, and
      the pin has a body, that is surrounded by the bearing and the one or more axial bearings, wherein the non-conductive material from which the bearing and the one or more axial bearings are made is selected from the group consisting of plastic, fiberglass reinforced plastic, polyether ether ketone, lignum vitae, and rubber.

2. The offshore frame construction according to claim 1, wherein the pin includes a steel body surrounded by a liner consisting of one of the following metals:
   aluminum bronze or
   Alloy 625.

3. The offshore frame construction according to claim 1, wherein the bearing is a spherical bearing including an externally spherical inner part and internally spherical outer part.

4. The offshore frame construction according to claim 1, further including a rubber bushing inserted into or vulcanized with an inner metallic bushing and/or an outer metallic bushing.

5. The offshore frame construction according to claim 1, wherein an interference fit is established between the pin and the bearing.

6. The offshore frame construction according to claim 5, wherein the interference fit is established by an expansion arrangement where the pin is expanded.

7. The offshore frame construction according to claim 5, wherein the interference fit is established by a tapered pin.

8. The offshore frame construction according to claim 1, further including pin joints configured and arranged to establish a single joint, a double or multiple joint, or a hinge.

9. The offshore frame construction according to claim 1, wherein the respective fork part and ear part are configured and arranged to be prefabricated parts prepared for and incorporated at the respective structural members.

10. The offshore frame construction according to claim 1, wherein the bearing is inserted into the ear part, and the bearing is a spherical bearing including an externally spherical inner part and an internally spherical outer part.

11. The offshore frame construction according to claim 1, wherein the bearing includes a first bearing in the ear part, and a second bearing in the fork part, and the offshore frame construction further including axial bearings between the fork part and the ear part.

12. The offshore frame construction according to claim 1, wherein the structural members include a first structural member that is a column and a second structural member that is a brace.

13. The offshore frame construction according to of claim 1, wherein the offshore frame construction is an offshore wind turbine foundation or a tetrahedral floating device.

* * * * *